United States Patent
Hanson et al.

(10) Patent No.: US 8,554,144 B2
(45) Date of Patent: Oct. 8, 2013

(54) TELEPHONE DIALER AND METHODS

(75) Inventors: Karrie Hanson, Westfield, NJ (US); Donnie Henderson, Manalapan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 869 days.

(21) Appl. No.: 12/288,058

(22) Filed: Oct. 16, 2008

(65) Prior Publication Data

US 2010/0099419 A1   Apr. 22, 2010

(51) Int. Cl.
*H04B 7/00*   (2006.01)

(52) U.S. Cl.
USPC ......... 455/41.3; 455/41.2; 455/445; 370/352; 709/250

(58) Field of Classification Search
USPC ............. 455/41.3, 41.2, 66.1, 39, 445, 422.1, 455/560, 74.1; 370/352; 709/250
See application file for complete search history.

(56) References Cited

U.S. PATENT DOCUMENTS

| | | | |
|---|---|---|---|
| 5,513,241 A * | 4/1996 | Dimitriadis et al. | 340/7.22 |
| 6,577,622 B1 * | 6/2003 | Schuster et al. | 370/352 |
| 7,327,981 B2 * | 2/2008 | Hundal | 455/41.2 |
| 7,363,045 B2 * | 4/2008 | Rogalski et al. | 455/465 |
| 7,925,296 B2 * | 4/2011 | Lin | 455/552.1 |
| 2004/0072544 A1 * | 4/2004 | Alexis | 455/74.1 |
| 2004/0132500 A1 * | 7/2004 | Rogalski et al. | 455/569.1 |
| 2005/0015516 A1 * | 1/2005 | Ju | 709/250 |
| 2006/0166715 A1 * | 7/2006 | Van Engelen et al. | 455/575.2 |
| 2009/0111518 A1 * | 4/2009 | Agrawal et al. | 455/557 |

OTHER PUBLICATIONS

"i2002 Internet Telephone Users Guide", Nortel Networks, Oct. 2003.*

"MTA 3338-Re Quick Install Guide", Innomedia Inc., Sep. 2006.*

* cited by examiner

*Primary Examiner* — Edward Urban
*Assistant Examiner* — Hsin-Chun Liao

(57) ABSTRACT

A system, device and method for placing a call in a telecommunications network is disclosed. In the method, a target address of a target station in a telecommunications network is received through a short range wireless connection. The method includes providing an alert that the target address was received, receiving a calling station off-hook confirmation, and establishing a connection through the telecommunications network between the calling station and the target station.

13 Claims, 3 Drawing Sheets

TELEPHONE DIALER AND METHODS

FIELD OF THE INVENTION

The present invention relates generally to telecommunications systems and services, and more particularly, to a system, device and method for using a personal electronic device to transmit a target address, such as a telephone number, to a receiving device for the purpose of placing a call on the telecommunications network coupled to the receiving device.

BACKGROUND OF THE INVENTION

Personal electronic devices have become ubiquitous in the last decade or so. As used herein, the term "personal electronic device" will refer to a plurality of network enabled devices, including cell or mobile telephones, Personal Digital Assistants (PDAs) and smartphones, fixed and mobile personal computers, photography, audio and video devices, dashtop mobile devices (vehicle platforms), electronic organizers and other emerging network enabled technologies that have capability to place and receive telephone calls over their respective networks. The term "personal electronic device" as used herein also encompasses devices that are not equipped to place and receive telephone calls, but have the capability to store and retrieve network addresses, such as telephone numbers, that are used in placing telephone calls. Where these personal electronic devices were once expensive items, they have evolved into pervasive, personal communication tools affordable by most of the population. In November of 2007, worldwide cellular/mobile telephone subscriptions reached 3.3 billion, equivalent to half of the global population.

Personal electronic devices are used as gateway devices to access cellular/mobile telephone networks, the Internet, services such as the World Wide Web (WWW) and access other public or private communication networks. For the purposes of this application, cell phones will be used as an example of a personal electronic device.

There remains is a large embedded base of landline telephones connected through the public switched telephone network (PSTN). Landline phones are typically associated with a location, such as a kitchen, den or garage in the home, or a conference room, a lobby or a reception desk in a work environment. Landline phones are typically communal in nature; that is, multiple individuals may use them, with the degree of personalization being minimal.

In contrast, cell phones and other personal electronic devices are generally thought of as belonging to an individual, not typically shared with others. As cell phone functionality evolved beyond merely placing a call, phones have become an individual's portable repository of contact information such as phone numbers, physical addresses, email address, as well as data files such as documents, email messages, voice mail messages, photos, audio files and video files.

At times, a person who has a cell phone or other personal electronic device may prefer to experience a call on a traditional land-line phone. That may be because the cell phone has a poor cellular signal or no signal, because the person would prefer the higher quality of a landline connection, because the cell phone is an "enterprise" phone and the call is a personal call, or for any number of other reasons.

Additionally, finding phone numbers on a personal electronic device such as a cell phone or an organizer is often facilitated by the searching capabilities of the device. When a user searches a cell phone for the phone number of a friend or business associate, a search of contact information is made. The search may key on the friend's name, or may key on recently dialed or connected numbers. The actual phone number is typically entered only once when first storing it, and is then rarely viewed again. A consequence of a cell phone being personalized by and for an individual is that when a user chooses to use any phone other than his own, he loses access to his contact information and data files stored in his phone.

It would therefore be desirable to provide systems and methods for accessing personal contact information stored on personal electronic devices when placing a call on another device. To the inventors' knowledge, no such system or method exists.

SUMMARY OF THE INVENTION

In accordance with a first aspect of the present invention, there is disclosed a method for placing a call in a telecommunications network. A target address of a target station in the telecommunications network is received through a short range wireless connection. The address is received from a personal electronic device incapable of placing a call in the telecommunications network. It is then determined that a calling station in the telecommunications network is in a "dial-ready" condition. A connection is established through the telecommunications network between the calling station and the target station.

The method may further comprise the step of producing an alert that the target address was received. That step may include causing the calling station to emit a ringing signal. The ringing signal may be a distinctive ring.

The short range wireless connection may utilize a protocol selected from the group consisting of BLUETOOTH wireless protocol, NFC (near field communication), UWB (ultra-wideband), WI-FI wireless technology and IR (infrared). The target address may be a telephone number.

The telecommunications network may a public switched telephone network (PSTN) and the "dial-ready" condition may be an "off-hook" condition. In that case, the step of establishing a connection through the telecommunications network between the calling station and the target station further comprises the steps of receiving a dial tone through the PSTN network; and transmitting the target address via DTMF signaling.

The personal electronic device may be a cellular telephone.

Another embodiment of the invention is an apparatus for establishing a connection in a telecommunications network. The apparatus comprises a network interface for connecting to the telecommunications network; a station interface for connecting to a calling station; a short range wireless receiver configured for receiving a network address of a target station; and a processor connected to each of the short range wireless receiver, the network interface and the station interface, the processor configured for generating an acknowledgement signal upon receipt of the network address, and for transmitting the network address to establish a connection through the telecommunications network between the calling station and the target station.

The acknowledgement signal may be a ring signal transmitted over the station interface after receiving a network address from the short range wireless receiver.

The station interface and the network interface may comprise RJ11 physical interfaces. The apparatus may be integral with the calling station.

The apparatus may further comprise a dialer connected to the controller for transmitting the target address through the network interface; wherein the controller is further configured for ascertaining whether the calling station is in a "dial ready" state, and, if so, and causing the dialer to transmit the target address over the network interface. The dialer may be a DTMF dialer.

The apparatus may include switch hook circuitry for connecting the network and station interfaces. The telecommunications network may be a public switched telephone network (PSTN).

The short range wireless receiver may be a receiver utilizing a protocol selected from the group consisting of BLUETOOTH wireless protocol, NFC (near field communication), UWB (ultra-wideband), WI-FI wireless technology and IR (infrared).

Another embodiment of the invention is method for placing a call to a target address through a first telecommunications network using a handheld telephony device capable of placing a telephone call through a second telecommunications network different from the first telecommunications network. The method comprises the steps of, in the handheld device, selecting the target address from a directory database containing a plurality of addresses of stations reachable through the first and second telecommunications networks; and transmitting the target address from the handheld device through a short range wireless connection to a device in the first telecommunications network.

The second telecommunications network may be a cellular wireless telecommunications network. The first telecommunications network may be a public switched telephone network.

The short range wireless connection may utilize a protocol selected from the group consisting of BLUETOOTH wireless protocol, NFC (near field communication), UWB (ultra-wideband), WI-FI wireless technology and IR (infrared).

These aspects of the invention and further advantages thereof will become apparent to those skilled in the art as the present invention is described with particular reference to the accompanying drawings.

DESCRIPTION OF THE INVENTION

Figure 1:
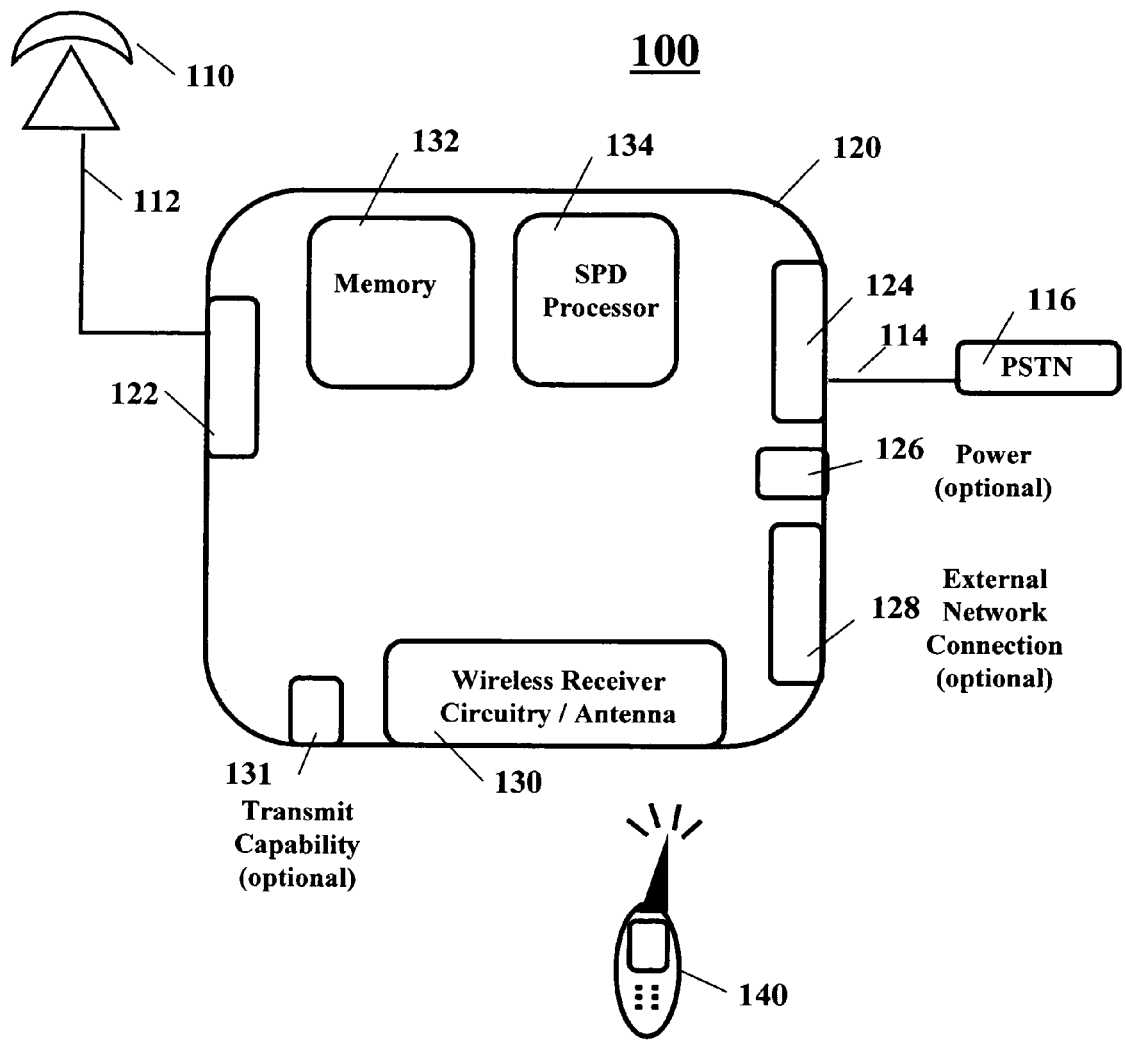
FIG. 1 depicts an exemplary system in accordance with the present invention.

It is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The present invention is an apparatus and method for utilizing personal contact information found on a personal electronic device to place a call on another device such as a land-line phone. A telephone number or another target address is transmitted wirelessly from the personal electronic device to a receiving device through a short-range wireless connection. The receiving device then places a call on the telecommunications network coupled to the receiving device.

A user may chose to use a landline phone rather than a cell phone for many reasons. The landline may have superior audio quality. The user may prefer the privacy of a phone booth or private space such as a hotel room, business office or conference room. The user may be forbidden from using a cell phone, such as in a hospital. A user may also choose to use a cell phone other than his own if he is running low on power, has marginal cellular coverage with his phone, or wants to conserve service minutes.

In one embodiment of the invention, the personal electronic device is not a communications device but is instead another electronic device on which is stored address data. In that case, the address data must be transferred to a communications device to make any call.

The type and way information is stored on a personal electronic device is customizable by the user, and therefore most effectively searched by the user who set it up. For example, when a user inputs contact information into her cell phone, she may decide to use only first names or nicknames, company or organization names or other schemes so the contact information can be quickly and accurately retrieved at a later time. Once a method is decided and the information input, a user can usually find desired contact information and dial the number all in just a few seconds. Frequently, only the name and possibly device or location (i.e. Bob Jones, Cell or Fred Smith, Work) is viewed by a user, with the phone number rarely viewed and typically forgotten.

In the present invention, the personal electronic device acts as a repository of personal contact information, and as a wireless transmitter of the contact information. The receiver of the transmitted phone numbers is a Special Phone Device (SPD) that interfaces with a telecommunications network. The SPD may be embedded or integrated within the actual telephone device with which it is associated and through which it will place calls, or the SPD may be an external adjunct to the telephone device, being connected in-line as described below. The SPD establishes a connection through the PSTN or through another telecommunications network to actually place the call.

FIG. 1 shows an exemplary system 100 in accordance with the present invention. The system comprises a calling station 110, a SPD 120, a telecommunications network such as the PSTN 116 and a personal electronic device 140 such as a cell phone. The calling station 110 may be a residential landline telephone, a payphone, a cellular telephone or any other device capable of placing a call over a telecommunications network.

In the exemplary system 100, the SPD 120 is installed in-line between the PSTN 116 and the calling station 110. The SPD is connected through twisted pair 112 and RJ11 interface 122 to the telephone 110, and through twisted pair 114 and RJ11 interface 124 to the PSTN 116. In another embodiment, the SPD 120 is an integral part of the calling station 110.

The SPD 120 further includes wireless receiver circuitry 130 with antenna, memory 132, a SPD processor 134, an optional power input 126, and an optional external network connection 128. The wireless receiver circuitry 130 has a primary capability as a receiver/antenna but may also have transmit capability 131. Receiver and transmit functions are via a wireless protocol, such as BLUETOOTH wireless protocol, NFC, UWB, WI-FI wireless technology, IR or some other protocol.

The SPD 120 is normally in a standby mode, ready to receive wireless signals, while the landline phone/calling station 110 to which it is connected remains in the "on-hook" state. A user operating cell phone 140, which is enabled with the functionality of the present invention, selects via a menu or some other method, the phone number/target address to be dialed, and wirelessly transmits the number to the SPD 120. The cell phone 140 transmits wirelessly via a wireless protocol, such as BLUETOOTH wireless protocol, NFC, UWB, WI-FI wireless technology, IR or some other protocol, to the wireless receiver circuitry/antenna 130 of the SPD 120. The phone number received from the cell phone 140 may be stored in the memory 132. The SPD 120 may produce an audio and/or visual alert signal acknowledging receipt of a number to dial. For example, the SPD may cause the phone to produce a distinctive ring.

The SPD processor 134 will then place a call. The SPD may wait for the phone 110 to be placed in a "dial-ready" state. In the case of a land-line phone connected to the PSTN, the dial-ready state means that the phone is taken "off-hook" by the user, and a dial tone is present. Alternatively, a "dial ready" state may mean that a cell phone has established a connection with a base station, or that a VoIP connection has been established by a VoIP phone. In an alternative embodiment, the SPD may not establish that a calling telephone is in a dial ready state, but may itself take the line from "on-hook" to "off-hook" or otherwise place the line in a "dial ready" state.

After verifying that there is a dial tone or network connection, the SPD dials, or causes to be dialed, the number provided by the wireless receiver circuitry 130 or the memory 132 of the SPD 120. The landline phone/calling station 110 or the SPD 120 may then again ring or signal notifying the user of the status of the call. Alternatively, another ring or signal may indicate the dialed number is busy, or yet another ring or signal may indicate the call has for some reason not been placed or has failed to place.

When the call has been successfully placed and the phone/target station associated with the phone number/target address starts to ring via the PSTN 116, the landline phone/calling station 110 receiver may be picked up and the phone call may proceed. The SPD 120 remains inactive, not able to receive a phone number, while the landline phone/calling station 110 is in the "off-hook" state. After the call is completed, the line returns to "on-hook" status and the SPD 120 returns to standby mode.

Power for operation of the SPD 120 may be provided by the PSTN or provided via optional power port 126. Additionally, wired networking capability may be provided for the SPD 120 via optional port 128 for communication using a hardwired protocol such as Ethernet or some other protocol. Alternatively, wireless networking capability may be provided within the wireless receiver circuitry 130, 131.

Figure 2:
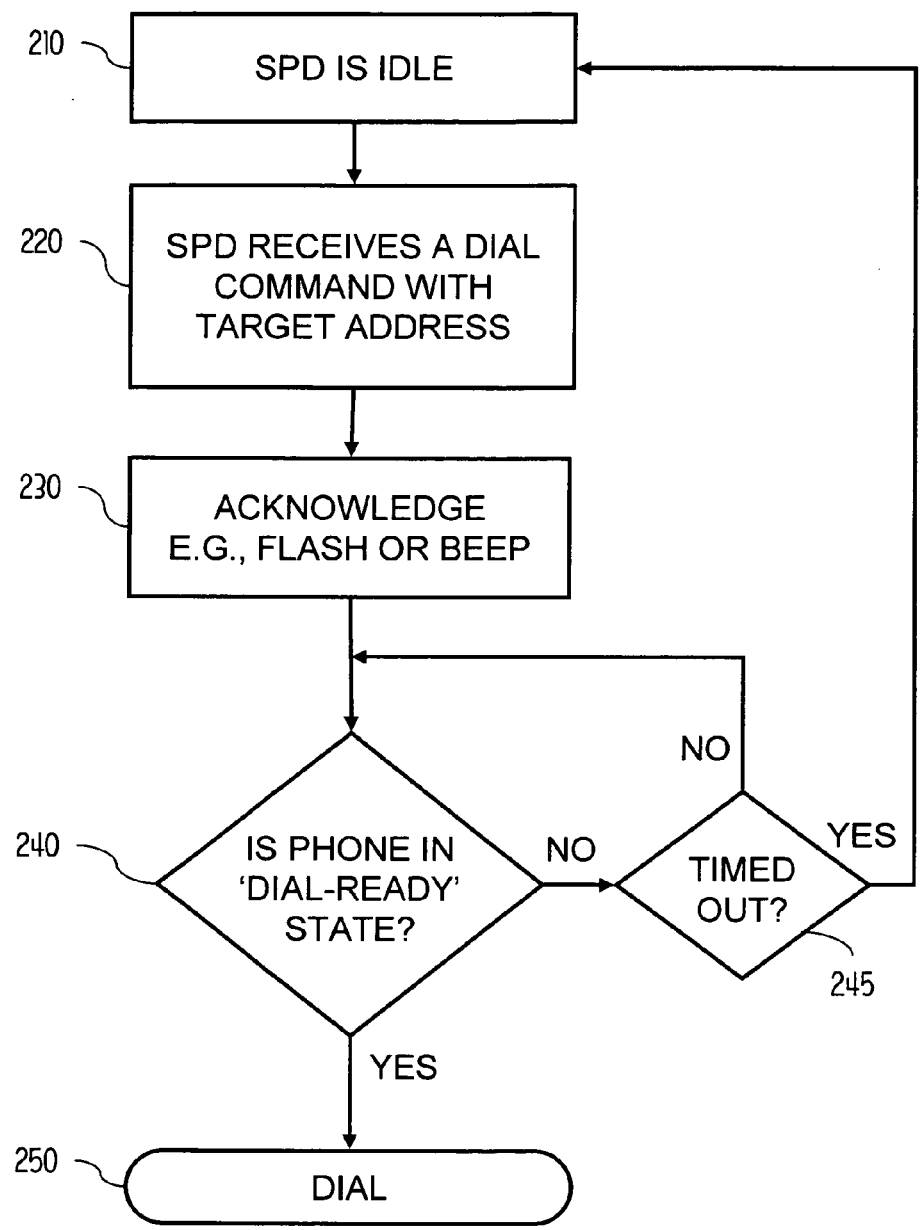
FIG. 2 is a flow chart depicting a method in accordance with the present invention.

FIG. 2 is a flow chart depicting a method 200 performed by the SPD in accordance with the present invention. In step 210, the Special Phone Device (SPD) is idle, ready to receive a phone number from a personal electronic device.

A user may then select via a personal electronic device, a phone number/target address and wirelessly send it to the SPD. A menu or searching utility or other such method may be used in the personal electronic device as part of the selection and sending process. In step 220, the SPD receives a dial command including a target address from the personal electronic device.

The SPD acknowledges receipt of the target address (step 230) by emitting an audio or visual signal such as a flash, a ring or a beep. The acknowledgement notifies the user that a phone number or other address has been successfully received by the SPD. Alternatively, the SPD may cause the calling telephone to signal the user, such as with a distinctive ring.

After signaling the user that the target address has been successfully received, the SPD checks (step 240) that the phone is in a "dial ready" state. For example, where the phone is connected to a PSTN network, the SPD may verify that the phone/handset has gone from on hook to off hook; i.e., that the user has picked up the handset. A "dial ready' state in general indicates that the calling telephone is connected to its network and the network is ready to receive a target address such as a telephone number. One skilled in the art will recognize that "dial ready" can mean something internally different for a different type of phone device.

In a preferred embodiment, a timer is used (step 245) to allow the user sufficient time to pick up the handset or otherwise place the telephone in a dial ready state. If the timer times out, the SPD is placed back in the idle state (step 210). Otherwise, the SPD recognizes that the telephone device has been placed in a dial ready state and the SPD "dials" (step 250). In one embodiment, "dialing" in this context means transmitting DTMF tone signals in the PSTN to establish a connection. The SPD may alternatively transmit the target address to the phone device, which establishes the connection.

Optionally, the user may be notified of the status of the call being placed. The placement of the call may fail for a variety of reasons, including phone mechanical/electrical problems, line problems, line busy or the system is overloaded or busy. The user is notified, via a ring, visual cue or a combination of a ring and a visual cue.

After the call is completed and the telephone device is hung up, the SPD senses the line state change to "on-hook" and returns to the idle state of step 210.

The personal electronic device of the present invention is capable of transmitting the target address to the SPD using a short range wireless connection. Personal electronic devices that are available today, such as cellular telephones, PDAs and electronic organizers, require modification to perform that function.

Figure 3:
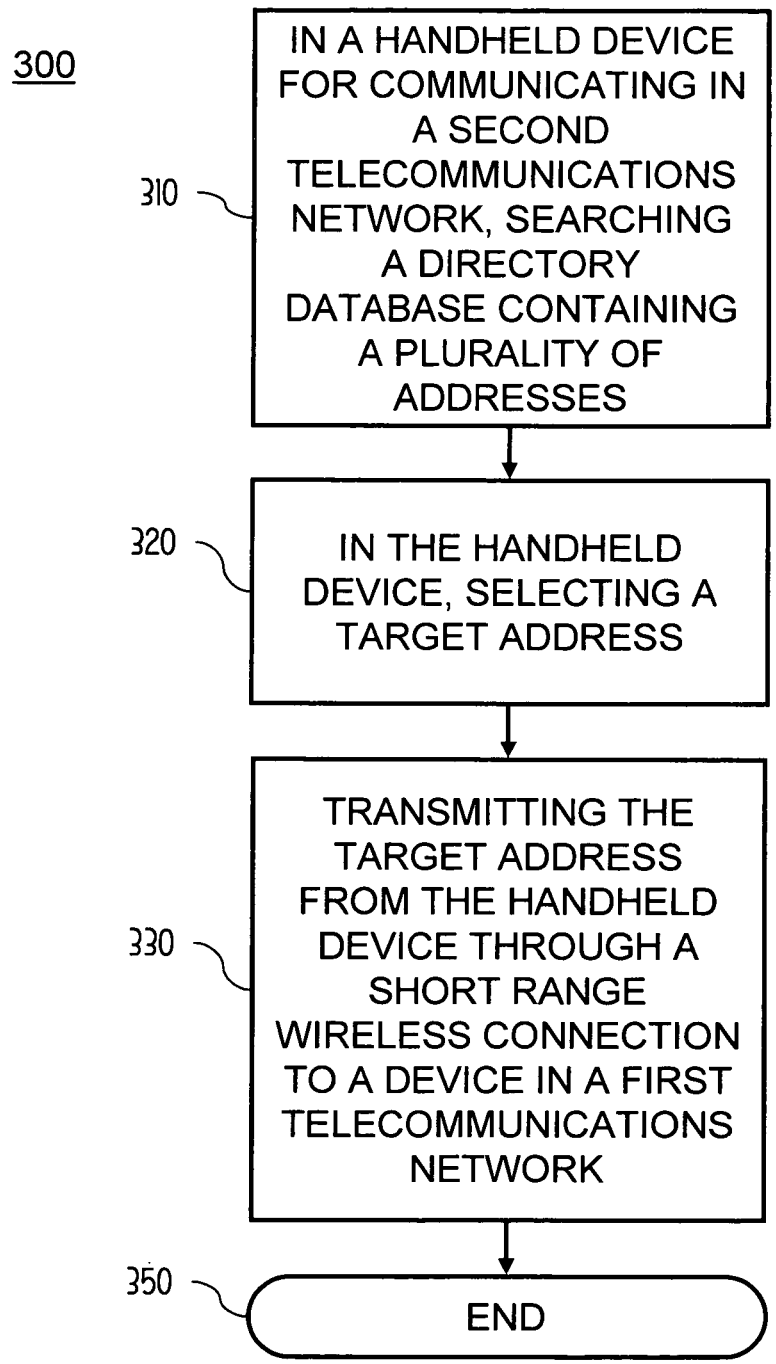
FIG. 3 is a flow chart depicting another method in accordance with the present invention.

A method 300 performed by the personal electronic device of the invention is depicted in FIG. 3. The personal electronic device of the invention is first used to search (step 310) a directory database containing a plurality of addresses. A target address is then selected (step 320). The personal electronic device is then used to transmit (step 330) the target address from the device through a short range wireless connection to a device in the PSTN or another network. Once the address is transmitted, the tasks performed by the personal electronic device are complete (step 350) and the connection is made by the SPD of the invention.

In accordance with the present invention, authentication of users may be implemented to limit the usage of a SPD with designated personal electronic devices. The authentication could limit access to designated users and/or limit access to designated phone numbers. Additionally, a SPD could utilize authentication to provide access to a secure, remote location where contact information may be stored or backed up.

In accordance with the present invention, a phone call could be placed via a SPD with the option to allow the originating personal electronic device or even an entirely different personal electronic device to join the conversation, effectively facilitating an ad-hoc teleconference.

In accordance with the present invention, a SPD may be connected via a wired protocol such as Ethernet or the like, or via a wireless protocol such as WI-FI wireless technology or the like for the purpose of communicating a phone number or other information/data bi-directionally between devices. Once access to the SPD's network is gained, the SPD's network may be utilized to communicate with interconnected networks of the Internet or run applications/services carried over the Internet, such as email, file sharing, voice over Internet protocol (VoIP) and the Web. Data files (i.e. text, graphics, photographs, video, audio or similar) may be quickly transferred via the SPD's network, bypassing the personal electronic device's network.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method for placing a call by a user from a calling station in a telecommunications network, comprising:
    receiving, through a short range wireless connection, from a personal electronic device incapable of placing a call in the telecommunications network, a target address of a target station in the telecommunications network;
    before receiving an indication that the user has placed the calling station in a "dial-ready" condition, producing to the user an audible alert that the target address was received;
    receiving an indication that the user, in response to the audible alert, has placed the calling station in a "dial-ready" condition; and
    in response to receiving the target address and receiving the indication, establishing a connection through the telecommunications network between the calling station and the target station;
    wherein producing the audible alert that the target address was received comprises causing the calling station to emit an audible ringing signal.

2. The method of claim 1, wherein the ringing signal is a distinctive ring.

3. The method of claim 1, wherein the short range wireless connection utilizes a protocol selected from the group consisting of BLUETOOTH wireless protocol, NFC (near field communication), UWB (ultra-wideband), WI-FI wireless technology and IR (infrared).

4. The method of claim 1, wherein the target address is a telephone number.

5. The method of claim 1, wherein:
    the telecommunications network is a public switched telephone network (PSTN);
    the "dial-ready" condition is an "off-hook" condition; and
    establishing a connection through the telecommunications network between the calling station and the target station further comprises:
    receiving a dial tone through the PSTN network; and
    transmitting the target address via DTMF signaling.

6. The method of claim 1, wherein the personal electronic device is a cellular telephone.

7. An apparatus for establishing a connection in a telecommunications network, the apparatus comprising:
    a network interface for connecting to the telecommunications network;
    a station interface for connecting to a calling station;
    a short range wireless receiver configured for receiving a network address of a target station;
    a processor connected to each of the short range wireless receiver, the network interface and the station interface; and
    a tangible computer-readable medium having stored thereon computer readable instructions that, when executed by the processor, cause the processor to perform operations comprising causing the calling station to generate, before receipt of an indication that a user has placed the calling station is in a "dial-ready" condition, an audible acknowledgement signal to the user upon receipt of the network address, and transmitting, upon receipt of the network address and receipt of an indication that the user, in response to the audible acknowledgment, has placed the calling station is in a "dial-ready" condition, the network address to establish a connection through the telecommunications network between the calling station and the target station;
    wherein causing the calling station to generate an audible acknowledgement signal comprises causing the calling station to emit an audible ringing signal.

8. The apparatus of claim 7, wherein the station interface and the network interface comprise RJ11 physical interfaces.

9. The apparatus of claim 7, wherein the apparatus is integral with the calling station.

10. The apparatus of claim 7, further comprising:
    a dialer connected to the processor for transmitting the target address through the network interface; and
    wherein the processor is further configured for ascertaining whether the calling station is in a "dial ready" state, and, if so, and causing the dialer to transmit the target address over the network interface.

11. The apparatus of claim 10, wherein the dialer is a DTMF dialer.

12. The apparatus of claim 7, wherein the telecommunications network is a public switched telephone network (PSTN).

13. The apparatus of claim 7, wherein the short range wireless receiver is a receiver utilizing a protocol selected from the group consisting of BLUETOOTH wireless protocol, NFC (near field communication), UWB (ultra-wideband), WI-FI wireless technology and IR (infrared).

* * * * *